A. P. MARR.
FLEXIBLE JOINT FOR DIVING ARMOR.
APPLICATION FILED SEPT. 18, 1919.
1,383,322.
Patented July 5, 1921.
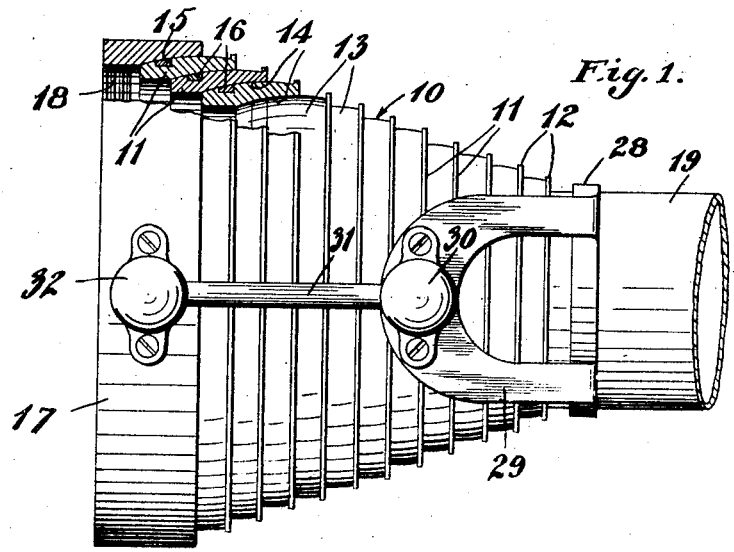
Fig. 1.
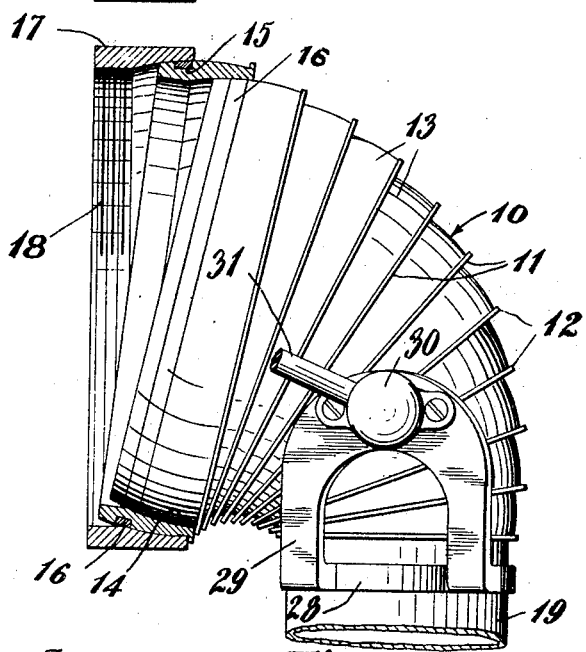
Fig. 2.
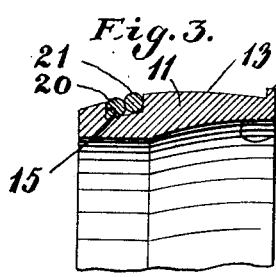
Fig. 3.
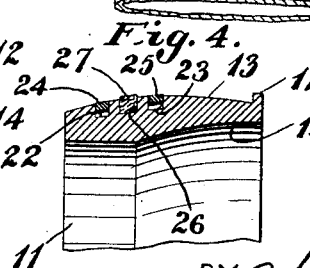
Fig. 4.
INVENTOR
Arthur Phelps Marr
BY
ATTORNEY

UNITED STATES PATENT OFFICE.

ARTHUR PHELPS MARR, OF BROOKLYN, NEW YORK, ASSIGNOR TO OCEANIC SALVAGE CORPORATION, OF NEW YORK, N. Y., A CORPORATION OF DELAWARE.

FLEXIBLE JOINT FOR DIVING-ARMOR.

1,383,322.

Specification of Letters Patent.

Patented July 5, 1921.

Application filed September 18, 1919. Serial No. 324,404.

*To all whom it may concern:*

Be it known that I, ARTHUR PHELPS MARR, a citizen of the United States, and resident of the borough of Brooklyn, county of Kings, city and State of New York, have invented certain new and useful Improvements in Flexible Joints for Diving-Armor, of which the following is a specification.

This invention relates to an improved non-collapsible flexible joint for diving armor and has for its principal object to provide a joint which is so designed as to permit the bending of a limb and yet protect the same from external pressure.

Another object of the invention is to provide a joint which, while being flexible will exclude water under pressure and relieve the wearer of undue strain.

As a further object the invention contemplates the provision of a means for keeping the joint extended in such a manner as to prevent external pressure from causing the elements to bind and jam and thereby render the joint inoperative.

Heretofore in the production of diving armor, many attempts have been made to provide a joint which will withstand great external pressure and yet retain its flexibility and while in some instances the purpose has been accomplished, the resultant joint has been found impracticable, owing to its great bulk. Therefore still another object of the invention resides in the provision of a joint which, while being designed to permit freedom of movement, is yet constructed in such a manner as to occupy a minimum of space.

Still another object of the invention is to provide a joint in which the cubical content and its displacement remain the same regardless of the position into which it is bent.

The following is what I consider a good means of carrying out this invention and the accompanying drawing should be referred to for a complete understanding of the specification which follows:—

In the drawings:—

Figure 1, is a side view of a joint constructed in accordance with this invention.

Fig. 2, is a view partly in section showing the joint bent at right angles.

Fig. 3, is an enlarged fragmentary sectional view of one of the elements showing a modified form of packing, and Fig. 4, is a view similar to Fig. 3, showing a still further modified form of packing.

Similar reference numerals indicate like parts in all of the figures where they appear.

Referring to the drawings in detail the numeral 10 designates as an entirety, a flexible joint constructed in accordance with this invention. This joint consists of a plurality of intermediate rings 11 of diminishing diameters and arranged to fit together in the manner shown in the drawing. Each ring is formed at its outer end with an annular outwardly extending flange 12 and extending rearwardly therefrom is a curved face 13 which is adapted to fit the internal curved face 14 of the next adjacent ring. As shown in the drawings these rings are provided adjacent their rear or inner ends, with suitable grooves 15 for the reception of packing such as the piston rings 16. The larger of the intermediate rings 11 is received in the attaching ring 17 which is provided with a suitable attaching means such as screw-threads 18, by means of which the joint is secured to a rigid portion of the armor. The smaller ring 11 is provided with a suitable attaching ring 11 is provided with a suitable attaching means by means of which the rigid portion 19 of the armor is connected to the joint.

In place of the piston rings 16 previously described I may provide a pair of rings 20 and 21 formed of wire, or the like. As a further modification, I may provide the ring 11 with a plurality of grooves 22 and 23 for the reception of the piston rings 24 and 25 between which a groove 26 for the reception of a suitable packing 27 is formed. It will thus be seen that a liquid tight joint is thereby provided between the rings which will provide freedom of movement.

In order to prevent the joint from compressing to such an extent as to cause it to jam, the member 19 is provided with an annular groove in which a ring 28 is free to rotate. This ring carries a yoke 29 to which a socket 30 is secured. This socket receives one end of a rod 31 while its opposite end is received in a socket 32 carried by the ring 17. It will thus be seen that as the joint is flexed, the ring 28 will partially rotate in its groove to compensate for the difference between the pivot points of the rod.

In order to further safeguard the device against leakage, I may upset the forward edges of the rings 11 so as to cause the forward edges of the inner faces 14 to frictionally engage the surfaces 13 and in this manner prevent a certain amount of water from entering the joint and contacting with the packing.

From the foregoing it will be seen that a particularly simple and efficient joint is provided which will withstand great external pressures without becoming jammed or otherwise inoperative.

Other modifications may be made within the scope of the appended claims without departing from the principle or sacrificing the advantages of the invention.

Having carefully and fully described my invention, what I claim and desire to secure by Letters Patent is:—

1. A watertight flexible joint comprising a plurality of rings, portions of the inner and outer surfaces of which comprise spherical zones, and means to prevent the rings from becoming jammed.

2. A watertight flexible joint comprising a plurality of rings, portions of the outer and inner faces of which comprise spherical zones, said rings gradually decreasing in diameter so as to fit into one another, means to limit the movements of the rings with relation to each other and means to prevent the rings from becoming jammed.

3. A watertight flexible joint comprising a plurality of rings, portions of the inner and outer surfaces of which comprise spherical zones, a yoke rotatable adjacent one end ring, a socket carried by the yoke, a socket carried by the opposite end ring and a rod universally connected to the sockets whereby the device will remain distended and will be prevented from becoming jammed.

ARTHUR PHELPS MARR.